United States Patent Office 3,360,498
Patented Dec. 26, 1967

3,360,498
STABILIZED POLYCARBONATES
Herbert L. Rawlings, New Martinsville, W. Va., assignor to Mobay Chemical Company, Pittsburgh, Pa., a corporation of Delaware
No Drawing. Filed June 23, 1965, Ser. No. 466,416
10 Claims. (Cl. 260—45.7)

ABSTRACT OF THE DISCLOSURE

Polycarbonate compositions stabilized with a stabilizing amount of a coated silica.

---

This invention relates generally to polycarbonates and more particularly to the stabilization of polycarbonates.

Polycarbonate plastics such as, for example, those prepared by the process described in Canadian Patents 578,585 and 578,795 possess outstanding properties with respect to heat distortion and impact resistance. In fact, polycarbonate plastics have the highest impact resistance of any unmodified plastic material known at this time. For these reasons, polycarbonate plastics have been used as substitutes for metals in many cases where other plastics would not possess sufficient properties to compete readily with metals in the different markets. Polycarbonates have also been used as substitutes for glass in many cases, such as, in sight glasses for storage tanks for different chemicals and the like. These applications of polycarbonate plastics are successful within limited degrees. However, parts fabricated from polycarbonate plastics could not compete in many places with glass and metal for the reason that the resistance to known chemical solvents and common atmospheric conditions are not as good as the materials being replaced.

The use of polycarbonate has been severely limited heretofore, particularly in the areas where the polycarbonate material is being subjected to atmospheric moisture. The atmospheric moisture has heretofore resulted in hydrolysis and degradation of the polycarbonate.

Polycarbonates may be obtained in powder or granular form and as such may be formed into fibers, films or molded articles by extruding or injection molding the molten polymer. The heating of the polymers has heretofore resulted in many cases in a severe discoloration of the final product. This discoloration is, of course, undesirable in certain applications such as fibers, films, or molded articles.

It is therefore an object of this invention to provide a polycarbonate that is stabilized against the degradating effects of atmospheric moisture. Another object of this invention is to provide a process for stabilizing polycarbonates against the degradative effects of moisture. Another object of this invention is to provide a polycarbonate that is stabilized against the degradative effects of heat. Still another object of this invention is to provide a process for stabilizing polycarbonates against degradative effects of heat. Still another object of this invention is to provide a polycarbonate having improved abrasion and solvent resistance. A further object of this invention is to provide a polycarbonate that is stable against degradation from moisture while simultaneously having the characteristic properties of polycarbonates.

The foregoing objects and others which will become apparent from the following description are accomplished in accordance with the invention, generally speaking, by providing a polycarbonate with a stabilizing amount of a hydrophobic agent such as a colloidal silica.

The amount of the stabilizer will vary depending upon the polycarbonate that is used. Such amounts are relatively simple to determine by experimentation. For example, very small amounts of the stabilizer are added to the polycarbonate and the amount is increased until the desired degree of stabilization against the degradative effects of moisture and heat is obtained. Normally less than 0.002% by weight based on the weight of the polycarbonate will not exert any stabilizing effect and more than about 10% by weight will not result in a substantial increase in the degree of stabilization. In addition more than about 10 percent by weight would alter the properties of the polycarbonate to such an extent that it would be undesirable in the formation of films, fibers, and molded articles.

The hydrophobic stabilizers may be added to the polycarbonate in a number of different methods. For example, powder or granular polycarbonates may be mixed with the hydrophobic stabilizers after which the mixture can be molded or extruded into the desired shaped article. Additionally, the hydrophobic stabilizers can be added to solutions of polycarbonates and to the molten polycarbonates during thermal processing. It is also possible to add the hydrophobic stabilizers to the polycarbonate reaction mixture before or during preparation of the polycarbonate.

A preferred method for mixing the hydrophobic stabilizers of this invention with the polycarbonate is to mix by intimate blending the two components, polycarbonate and hydrophobic stabilizer. This blending can be accomplished by any suitable blending apparatus. The blend can then be extruded in a standard extruder and the resulting strands produced continuously in the form of pellets of polycarbonate containing the stabilizer.

Since all polycarbonates regardless of the compound from which they are formed or the process used in forming them are susceptible to degradation by atmospheric moisture and heat, the novel method and additive for this invention may be employed will all polycarbonate compositions which are prepared utilizing any of the commonly known methods for the production of the polycarbonates. The methods of preparation for the high molecular weight polycarbonates capable of being stabilized by this invention are well known. The polycarbonate material, for example, can be produced from a dihydroxydiaryl alkane and phosgene or a diester of a carbonic acid as described in Canadian Patents 578,585, 578,795 (issued June 30, 1959), 594,805 (issued Mar. 22, 1960); and U.S. Patent 3,028,365 (issued Apr. 3, 1962). Other processes for producing polycarbonates which may be used in accordance with this invention are disclosed in U.S. Patents 2,999,846, 2,970,131, 2,991,273, 2,999,835, 3,014,891 and 3,017,424.

In a preferred method for the preparation of polycarbonates, an organic dihydroxy compound is reacted with phosgene or chloro-carbonic acid esters of organic dihydroxy compounds in the presence of chloro-alkanes such as, dichloromethane, trichloromethane or mixtures thereof. The polycarbonate is then formed in a solution in the chloro-alkanes after which the solvent is evaporated and the polycarbonate obtained in powdered form. The polycarbonate solution may be mixed with water and dimethylbenzene and then evaporated. It is possible to use other methods to prepare a polycarbonate without departing from the spirit of this invention.

The organic dihydroxy compounds which may be used may be aromatic, aliphatic or cycloaliphatic dihydroxy compounds. Also, the aromatic dihydroxy compounds may be reacted with formaldehyde before or during the preparation of the polycarbonates. Examples of the aromatic compounds are: di(monohydroxyaryl) alkanes, di(monohydroxyaryl) sulfones, di(monohydroxyaryl) ethers and di(monohydroxyaryl) thioethers. The above aryl radicals may be the same or different and in addition they may have substituents such as halogens and/or alkyl radicals. The radical linking he benzene rings may be alkyl, cycloalkyl or arylalkyl.

Examples of these aromatic dihydroxy compounds are (4,4'-dihydroxy-diphenyl) methane; 2,2(4,4'-dihydroxydiphenyl) propane; 1,1(4,4'-dihydroxy-diphenyl)-cyclohexane; 1,1(4,4'-dihydroxy-3,3'-dimethyl diphenyl)-cyclohexane; 2,2(2,2'-dihydroxy-4,4'-di-tertiary butyl-diphenyl)-propane; 1,1(4,4'-dihydroxy - diphenyl)-1-phenylethane; 2,2(4,4'-dihydroxy - 3,3'-5,5' - tetrachloro-diphenyl)-propane and the like. Dihydroxy aryl sulfones, such as (4,4'-dihydroxydiphenyl) sulfone; (4,4'-dihydroxy-3,3'-dimethyl-diphenyl) sulfone; 2,2'-dihydroxy-1,1'-dinaphthyl sulfone are also useful. Dihydroxy aryl ethers such as 4,4'-dihydroxy-diphenyl ether; 4,4'-dihydroxy-3,3'-dimethyl-diphenyl ether; 4,4'-dihydroxy-diphenyl-thioether; 4,4'-dihydroxy-2,2-dimethyl diphenyl thioether and the like may be employed. Other aromatic dihydroxy compounds which may be employed are hydroquinone; resorcinol; pyrocatechol; 2,4'-dihydroxy diphenol; 2,2'-dihydroxy diphenol; 1,4-dihydroxy naphthalene; 1,2-dihydroxy naphthalene; 1,5-dihydroxy anthracene, and 2,2'-dihydroxy dinaphthol-1,1' and the like. Aliphatic and cycloaliphatic dihydroxy compounds which may be used are ethylene glycol; diethylene glycol; triethylene glycol; polyethylene glycol; thiodiglycol, ethyene dithiodiglycol; propane-diol 1,2 and the di- and polyglycols prepared from propylene oxide-1,2; propanediol-1,3; pentanediol-1,5; hexanediol-1,6; octanediol-1,8; decanediol - 1,10; cyclohexanediol - 1,2; 2,2(4,4'-dihydroxy dicyclohexyl) prapane and 2,6-dihydroxy decahydronaphthalene and the like.

The chlorocarbonic acid esters and organic dihydroxy compounds that are used in the preparation of the polycarbonates may be any chloro carbonic acid ester of the above described organic dihydroxy compounds.

A polycarbonate can also be produced by introducing phosgene into solutions of di(monohydroxyaryl) alkanes in organic bases such as dimethylaniline, diethylaniline, trimethylamine and pyridine or into solutions of di(monohydroxyaryl) alkanes in different organic solvents such as benzene, ligroin, cyclohexane, methylcyclohexane, benzene, tolylene, xylene, chloroform, methylene chloride, carbontetrachloride, trichloroethylene, dichloroethane, methyl acetate and ethyl acetate with the addition of an acid binding agent.

Hydrophobic stabilizers contemplated herein are silica particles which are surface coated with an organophilic material by chemical reaction in contra-distinction to physically homogenous chemical compounds of low molecular weight silica with organic molecules. A hydrophobic silica may be prepared from a silica solvent which has been prepared by the redispersion of silica gels. There may be employed for example, alcohols such as those described in U.S. Patents 2,285,449 and 2,375,738.

While the above and other known solvents can be used, the best results are obtained by using sols which are composed of dense spherical particles of amorphous silica which are substantially non-aggregated and which are realtively uniform in size.

Sols of small particle size may be prepared by passing an alkali metal silicate through an ion exchange resin and then concentrating with heat to give whatever silicate content is desired. The sols as described in U.S. Patent 2,574,902 are composed of dense amorphous silica particles having a particle size range above about 10 millimicrons. Where it is advantageous to employ sols which are comparatively free of impurities, the processes described in U.S. Patents 2,577,484 and 2,577,485 may be used.

In the formation of the alcosol as described in U.S. Patent 2,801,185 it is preferred that the sol be concentrated as much as possible since the first step is to remove water and since as little water should be present as possible. Before adding alcohol to the sols, the sodium content should be low and if not already low it should be lowered by the use of an ion exchange resin. The pH of the sols should be fairly low, preferably around a pH of 3.

A silica sol is mixed with a water immiscible organic liquid and the water is removed by distillation. The distillation can be affected under vacuum if desired, which is preferred in many cases. Since the system is comparatively unstable during the water removal step, it is desirable to perform this operation in as short a time as possible and to remove water at as low a temperature as possible. If too long a time is used the sol will tend to gel or form precipitates or aggregates. A water-miscible liquid such as methyl-ethyl-ketone, triethylphosphate, methyl "Cellosolve" acetate or acetone may be used. During the dehydration it is preferred to have alcohol present though it could be added towards or at the end of the dehydration. It is most preferred to use an alcohol as a water-miscible liquid. There may be used for example ethanol, n-propanol, tertiary butyl alcohol, iso-propanol, ethyl "Cellosolve," methyl "Carbitol" and ethyl "Carbitol." The dehydration should be carried out to the point where water is substantially all removed. The water content should be reduced for instance until it is no greater than about 1%, while maintaining a temperature as low as possible. After the water content has been found to be below 1%, the temperature may be raised gradually and esterification may proceed if the coating is to be an ester coating. A proportion of water can be effectively diminished by the use of correspondingly large amounts of alcohol. This offers the advantage that it makes the sol being handled more dilute and therefore minimizes aggregation. The sol should not however be so dilute as to require the handling of excessive quantities of liquid.

The coating applied to the silica particles should effectively cover the entire surface of the silica particles. By effecting a substantially complete covering or coating, the particles are made non-siloxane bonding. This coating material may be any organic substance which chemically reacts with the silica surface of the particles and enough must be used to effectively cover the surfaces. A coating may for example be a monomolecular layer of trimethylsilyl groups attached to the surface through an oxygen atom. If the coating is to be an ester coating, esterifying agents such as primary and secondary alcohols may be used. Thus the alcohols can be defined as having the formula

ROH wherein R is a hydrocarbon radical in which the carbon atom attached to oxygen is also attached to at least one hydrogen. Further, examples of monohydric alcohols as normal straight chain alcohols, such as ethyl, n-propyl, n-butyl, n-pentyl, n-hexyl, n-heptyl, n-octyl, n-nonyl, n-decyl, n-undecyl, n-dodecyl, n-tetradecyl, n-hexadecyl and n-octadecyl; branch chain primary alcohols such as iso-butyl, iso-amyl, 2,2,4-trimethyl hexane-1-ol and 5,7,7 trimethyl, 2(1,3,3-trimethylbutyl) octane-1-ol; secondary alcohols such as isopropyl-sec-butyl (2-butanol), sec-amyl (2 pentanol) sec-n-octyl (methyl hexyl carbinol), methylisobutyl carbinol and di-iso-propyl carbinol. Examples of alicyclic alcohols of this class are cyclopentanol, cyclohexanol, cycloheptanol and menthol. Examples of alcohols having ethylenic unsaturation are allyl, crotyl, oleyl, citronelol and geraniol. Acetylenic unsaturation is illustrated by propargyl alcohol. Aromatic alcohols are illustrated by benzyl, betaphenyl-ethyl, hydrocinnamyl, alphamethylbenzyl and cinnamyl.

Where it is desired that the resulting ester groups be alkoxy groups, it is preferred that saturated primary and secondary alcohols be used. In addition, the saturated primary alcohols are the preferred esterifying agents because they react more readily and at lower temperatures than do seconadry or tertiary alcohols and are more stable than tertiary alcohols or unsaturated alcohols at the reaction temperatures. The unsaturated alcohols especially those containing one or more triple bonds or multiple double bonds are quite often unstable. Consequently, those unsaturated alcohols which are known to polymerize, crack or otherwise decompose under these reaction conditions, such as temperature and pressures which are required to promote esterification of the silica, cannot be employed in this reaction. However, there are a considerable number of unsaturated alcohols which are not particularly unstable under these esterification conditions and may be used in carrying out this reaction. Under certain conditions, as for example, in the case of allyl alcohol, a small amount of polymerization may occur during the esterification process. If desired, such polymeric by-products may be removed by extraction methods but this is not necessary for many uses. Due to the instability of the unsaturated alcohols and the possible formation of by-products resulting from their use, they are not preferred in the esterification processes. However, for certain uses such as the incorporation of the esterified silica as a reinforcing filler in certain organic polymer, the silicas esterified with unsaturated alcohols may be highly preferred since subsequent treatment may result in cold polymerization of the unsaturated —OR groups on silica with active unsaturated linkages in the partially polymerized organic polymer.

There appears to be no upper limit to the number of carbon atoms which may be present in the esterifying agent. As a practical matter, the group of alcohols having from 2 to 18 carbon atoms include the majority of known monohydric alcohols and offer a selection of organic molecule sizes which should be adequate for any purpose. The alcohols having from three to six carbon atoms are especially preferred because they are relatively low boiling liquids which are most readily handled in the process and when present as unreacted excess can most readily be removed from the esterified product by vacuum distillation without the necessity of extraction procedures. They are also the most economical to use and yield a product having a low ratio of organic matter to silica, which is very desirable for certain uses.

The tertiary alcohols are much less reactive than the primary and secondary alcohols and are also lacking in stability at the higher temperatures. At higher temperatures where the reaction might be expected, the alcohol decomposes and yields only very incomplete esterification at 200° C. in an autoclave. While the lower alcohols, particularly methyl alcohol will react with silicous material to form a surface of methoxy groups, the resulting product is not stable to hydrolysis. Furthermore, the product is not very highly hydrophobic even when the surface is crowded with methoxy groups.

The esterifying agent need not be a single alcohol but may consist of mixtures of alcohols. For example, a mixture of isobutyl and secondary butyl alcohols can be used. Also, a mixture of different chain links can be used as found in technical grades of higher alcohols made from coconut oil, lard and tallow.

The ratio of alcohol to silica is limited only by the fact that sufficient alcohol must be present to provide an adequate excess over that consumed in the reaction and to provide a sufficient volume of liquid medium to minimize aggregation prior to the time when esterification is substantially complete. The alcohol should be present in a liquid state, that is, it should not be gaseous at the temperatures and pressures used.

During the esterification reaction, water is formed which may be removed preferably by distillation either direct or azeotropic, depending upon the particular system. If the volume of alcohol is large relative to the amount of silica, the percentage of water will not be as great. In any event, the removal of water must be continued in order to maintain a water content below 1% and preferably as low as 0.1% or less, as the system is heated to bring about completion of the esterification reaction.

There is a definite time-temperature relationship in the esterification reaction. At a given temperature the reaction appears to proceed quite rapidly up to a certain point which is characteristic of the temperature and of the alcohol and thereafter proceeds more slowly. The minimum reaction time and temperature in order to obtain complete esterification varies with the type of alcohol used. Short-chain primary alcohols react somewhat more rapidly than long chain alcohol and in general short chain alcohols react more rapidly and more completely at any given temperature than the long chain and secondary alcohols. It appears that the rate of reaction and the extent of reaction is related in some way to the shape of the alcohol molecule employed. The longer-chain alcohols and the more highly branched alcohols, particularly the secondary alcohols represent varying amount of steric hindrance.

The temperature and time of reaction varies with the alcohols employed. For example, with primary alcohols, the temperature ranges from about 100° to about 200° C. and the time is about 1 hour. While secondary alcohols require a considerably longer time and the temperature range is from about 200° up to about 275° C. There is, however, a maximum temperature at which the reaction of the alcohol and silica can be carried out, due to the fact that thermal decomposition of the alcohol will occur if the temperature is too high. The temperature should not exceed the thermal decomposition of the alcohol while in the presence of the silica nor should it exceed the point of thermal stability of the esterified product. Because of the general instability of the alcohols and the esters at high temperatures, it is preferred that prolonged heating of the reaction mixture be avoided and that only sufficient heat be used to achieve a complete esterification reaction.

Once the ester coating has been applied, the alcohol may be completely removed and the product may be dissolved in many other types of organic solvents. The best solvents for a particular product will depend upon the nature of the particular coating used. Concentrated dispersions containing up to about 70% or even more of silica dioxide may be obtained, particularly in those instances where the particles are very uniform in shape and size and are in the preferred size range. Also even larger amounts of silica may be present but as the quantity of organic solvent becomes less, the product is merely wetted with the solvent and can scarcely be called a dispersion. Products which are more nearly paste dispersions than true sol-like dispersions have certain advantages. Instead of dispersing the products in organic solvents of the usual type which are liquid at ordinary temperatures, they may be dispersed in high melting organic compounds such as thermal plastic polymers such as polycarbonates. Again, the materials may be dispersed in the organic solvents employed in the preparation of the polycarbonates or they may be dispersed in the molten polycarbonate prior to extrusion.

While the particle size may vary over a broad range, it is preferred that it have a size greater than about 5 millimicrons and an upward limit of about 200 millimicrons. More specifically, it is preferred that the particle size range from about 10 to about 80 millimicrons.

The polycarbonate material may be combined with the treated silica in a dry blending operation in which the polycarbonate in the form of granules and the silica additive are mixed together in a commercial blender or tumbling apparatus until the additive is thoroughly blended to the resin. After blending the granules can be extruded in a conventional extruder such as on a 1½ inch mpm extruder and pelletized. Further processing of the pellets such as by injection molding will produce a polycarbonate product having excellent resistance to atmospheric moisture while concurrently having good heat stability, little or no initial color and no alteration of the other normal physical properties of the polycarbonates.

The combining step is not limited to any particular mixer or blender, or temperature and pressure range regardless of the method used for combination. For most purposes the above described dry blending technique is adequate. The purpose of combining is to bring the novel silica into contact with the polycarbonate prior to producing a finished polycarbonate product, and this may be accomplished by the techniques described herein.

The composition of the present invention may be produced by separately preparing a solution of the polycarbonate and mixing it with the treated silica or it may be prepared by dispersing the treated silica directly into the molten polycarbonate. By the former method, for instance, one might simply mix an organic dispersion of the treated silica with a polycarbonate solution whereas by the latter method one might disperse an organic dispersion of the silica and the molten polycarbonate, for example, by extruding through a conventional extrusion apparatus.

The following examples describe the process for successfully mixing a novel treated silica and polycarbonate and the improvement and properties of the polycarbonate so prepared. The parts designated in these examples are by weight unless otherwise specified.

*Example 1*

Approximately 343 parts of (4,4-dihydroxy diphenyl) propane, about 3.3 parts of tertiary butyl phenyl are suspended in about 1,320 parts of water in a well agitated reaction vessel. The reaction vessel is equipped with a gas addition tube and a drip tube for the addition of liquid. The oxygen is removed from the suspended (4,4'-dihydroxy diphenyl) propane slowly by blowing nitrogen through for about 15 minutes. After the oxygen is removed about 240 parts of a 50% solution of sodium hydroxide are added. The reaction vessel is then cooled to about 25° C. by external cooling and about 750 parts of methylene chloride are added to the reactants with agitation. Upon completion of the methylene chloride addition, phosgene is added at such a rate that over a 100-minute period about 129 parts (approximately 1.8 mols) of phosgene are added with agitation. Concurrently with the phosgene addition, 50% sodium hydroxide is added at such a rate that in an 80-minute period about 96 parts of sodium hydroxide are added to the mixture. The temperature during the phosgenation reaction is maintained at approximately 25° C. by external cooling. At the end of the phosgenation period one part of triethylamine is added to the reaction mixture and the mixture agitated for an additional period of about 20 minutes. The agitation is stopped and the mixture is allowed to separate into two phases. The lower heavy phase is the polycarbonate solution while the upper phase contains water, unreacted sodium hydroxide and sodium chloride. The upper phase is removed by decantation and discarded. The polymer solution is successively washed with approximately 1% sodium hydroxide followed by a 1% phosphoric acid wash which is then followed with water washes until the overflow water is essentially free of electrolytes. After evaporation of the solvent, a colorless clear type plastic having a softening point of between 220 and 223° C. is obtained.

*Example 2*

Approximately 484 parts by weight of (4,4'-dihydroxy diphenyl) butane, about 3,280 parts by weight of a 10% solution of caustic soda and about 500 parts by weight of tolylene are added to a reaction vessel. Approximately 300 parts of phosgene is added to the reaction vessel over a period of about 3 hours at a temperature of about 25° C. The mixture is then heated to a temperature of from about 40° C. to about 45° C. for an additional three hours with agitation. The liquid polycarbonate, thus formed, thickened until it reached a paste-like consistency. After standing for several hours at room temperature, the aqueous layer is separated by decantation and the paste is kneaded with water until the wash water shows no further alkaline reaction and the tolylene is removed by steam distillation. A colorless material is thus obtained which is soluble in benzene, methylene chloride, toluene and ethyl acetate.

*Example 3*

Approximately 57 parts by weight of (4,4'-dihydroxy diphenyl) cyclohexane, 70 parts by weight of anhydrous pyridine are added to a reaction vessel. Approximately 180 parts by weight of a 12% solution of phosgene and chloroform is added to the reaction vessel at 0° C. over a period of about 2 hours with agitation. When approximately 120 parts of the phosgene solution is added, the reaction mixture is diluted with about 300 parts by volume of methylene chloride. An additional volume of methylene chloride is added to the reaction mixture and shaken out with water and dried. After evaporation of the solvent, a hard, colorless mass, having a softening point of about 180° C. is obtained.

*Example 4*

A silica sol is prepared by passing a diluted solution of sodium silicate having a $SiO_2:Na_2O$ ratio of 3.25 to 1 through a bed of an ion exchange resin in the hydrogen form. The sol contains 3.86% $SiO_2$ by weight. The silica sol is heated at reflux temperature for about 1.5 hours. At the end of the reflux period, the relative viscosity of the silica sol is in the range of from 1.15 to 1.60 at 10 percent $SiO_2$. To about 200 parts of this refluxed silica sol is added about 1,000 parts of the original sol at a uniform rate over a period of about 3.5 hours. The body of combined sol is maintained at the reflux temperature while the distilled water is being returned as reflux. The aqueous solution of colloidal silica is then contacted with an ion exchange resin in the hydrogen form to remove the sodium ions. The pH of the sodium free sol is about 3.5. Approximately 3.2 parts of the sodium free deionized colloidal silica is diluted with about 8 parts of normal propyl alcohol. The propanol diluted sol of colloidal silica is then added to a still containing about 6 parts of normal propyl alcohol with agitation. The addition is carried out at such a rate that the water is continuously removed as azeotrope with normal propyl alcohol (boils at about 88° C.). When all of the aqueous alcosol of colloidal silica is added to the distillation flask, the distillation is continued until the water content in the sol is reduced to about 0.5%, thus producing an essentially anhydrous silica alcosol in the still. About 400 parts of this anhydrous alcosol are mixed with about 300 parts of a branched chain octadecyl alcohol. Propanol is then distilled from the mixture at atmospheric pressure leaving the colloidal silica as a relatively clear slightly viscous solution in the octadecyl alcohol. This colloidal solution is then heated to an elevated temperature to bring about an exchange of octadecyl groups for propyl groups. Distillation of the mixture is continued at atmospheric pressure until the temperature in the distillation flask is approximately 140° C. Nitrogen is then added to the flask and the temperature is further raised to about 200° C. for about 3 hours. The pressure in the distillation system is reduced to between about 12 and 15 millimeters and the free octadecyl alcohol removed, the boiling point at this pressure being about 170° C. The powdery residue in the flask is then dried in a vacuum oven at about 10 millimeters pressure and at a temperature of about 180° C. for about 2 days. The dry powdery product thus obtained is readily soluble in kerosene to give a clear colloidal solution.

*Example 5*

A portion of the anhydrous propanol sol described in Example 4, containing approximately 19.9% solids is added to benzyl alcohol. About 500 parts of the 19 percent propanol sol is added to about 500 parts of benzyl alcohol in a distillation system equipped with a fractionating column and the propanol removed by distillation at atmospheric pressure. The temperature of the material in the distillation flask is maintained at about 125° C. while the propanol is being removed. The temperature in the distillation flask was increased to about 190° C., the boiling point of benzyl alcohol and maintained at this temperature for approximately 2 hours. The unreacted benzyl alcohol is then removed under vacuum at about 100° C. The resulting dry powder forms a clear colloidal solution in benzene.

*Example 6*

A polycarbonate resin produced in accordance with the procedure of Example 1 is separated into several portions. To each of the separate portions is added the powdered silica produced in accordance with Example 3 in varying parts by weight. Each portion is dry blended in a blending apparatus for about 10 minutes. A controlled portion of the polycarbonate resin is retained from the same batch prepared quite like Example 1 to which no powdered silica is added. The separate blended and control compositions are individually molded and subjected to conditions of 100% humidity at 250° F. for three hours.

Table I is illustrative of the results obtained when several samples of the molded specimens are subjected to the autoclave test and then tested for strength properties.

TABLE I.—IZOD IMPACT STRENGTH
[Ft. lb./in. notch]

| Silica Percent by Wt. | Before Treatment | | After Treatment | | Percent Low Impact Values |
|---|---|---|---|---|---|
| | D | G | D | G | |
| 0 | 17.5 | 17.2 | 2.8–16.5 | 2.9–16.1 | 50 |
| 0.5 | 17.1 | 16.8 | 2.4 | 2.5 | 100 |
| 5.0 | 13.8 | 13.0 | 10.5 | 10.0 | 0 |

D—Dead end of test bar.
G—Gate end of test bar.
Test Bar—⅛″ x ½″ x 5″.

mately 3 hours. The results of the "Autoclave Test" and the strength properties are illustrated in Table II.

TABLE II.—IZOD IMPACT STRENGTH
[Ft. lb./in. notch]

| Silica Percent by Wt. | Before Treatment | | After Treatment | | Percent Low Impact Values |
|---|---|---|---|---|---|
| | D | G | D | G | |
| 0 | 17.5 | 17.2 | 2.8–16.5 | 3.5–16.1 | 50 |
| 0.5 | 18.3 | 17.2 | 2.7 | 2.7 | 100 |
| 5.0 | 14.6 | 13.8 | 12.0 | 10.8 | 0 |

D—Dead end of test bar.
G—Gate end of test bar.
Test bar—⅛″ x ½″ x 5″.

*Example 8*

About 240 parts of plastic polycarbonate prepared by the procedure described in Example 2 is added to about 1060 parts of methylene chloride in a Baker-Perkins Sigma mixer to form a solution containing about 18.5% of polycarbonate. The solution is separated into several portions. To the separate portions of polycorbonate are added the surface treated silica with varying parts by weight with agitation. After the addition of treated silica is complete each portion is heated to remove the solvent. The residual solvent is removed from the separate blended compositions by additional drying. The separate compositions are individually molded. A control composition is treated in accordance with the procedure described above. The molded articles thus prepared from the separate blended and control compositions are subjected to the "Autoclave Test" and the "Heat Relaxation Test." In the "Heat Relaxation Test," the articles are exposed to a temperature of about 100° C. at relatively low humidity for extended periods of time.

The results of the "Autoclave Test" and the "Heat Relaxation Test" are illustrated in Table III.

TABLE III.—IZOD IMPACT STRENGTH
[Ft. lb./in. notch]

| Silica Percent by wt. | Original | | Autoclave | | Percent Low Impact Values | Heat Relaxation (64 hrs.) | | Percent Low Impact Values |
|---|---|---|---|---|---|---|---|---|
| | D | G | D | G | | D | G | |
| 0 | 17.6 | 17.2 | 2.8 | 2.4 | 100 | 3.2–15.9 | 3.3–17.1 | 33 |
| 0.5 | 16.9 | 16.4 | 2.0 | 2.4 | 100 | 3.4–14.7 | 2.5 | 67 |
| 4.0 | 15.7 | 15.0 | 2.4 | 2.7 | 100 | 2.6–11.8 | 2.4–12.8 | 33 |
| 5.0 | 13.0 | 12.1 | 9.1 | 9.3 | 0 | 11.1 | 10.6 | 0 |

D—Dead end of test bar.
G—Gate end of test bar.
Test bar—⅛″ x ½″ x 5″.

*Example 7*

The surface treated silica powder produced according to Example 3 is added to an 18.5% solution of polycarbonate prepared in accordance with Example 1 in methylene chloride in amounts varying from about 0.5 percent to about 5 percent by weight of the polycarbonate. The silica is dispersed in the solution with an ordinary laboratory mixer and the solvent stripped from the polycarbonate-silica solution in a Baker-Perkins Sigma mixer with agitation until the concentrated solution solidifies. The polycarbonate-silica residue is dried for 24 hours at a temperature of about 110° C. under about 28 inches vacuum to remove the residual solvent. The samples are molded from the dried powder and subjected to conditions of 100% humidity at about 250° F. for approximately Incorporation of the treated silica into the polycarbonate system enhances many of the physical and chemical properties of the polycarbonate resin. Notably, there is an improvement in the release characteristics of the material from metal and ceramic surfaces, a reduction of melt viscosity which enables fabrication at lower temperatures and lower molding pressures, improved ductility and toughness, a greater resistance to wetting and hydrolytic degradation and development of an opaque or milky white appearance, which is aesthetically pleasing and which is useful in masking the normally transparent appearance of the polycarbonate where this is desired.

The polycarbonate materials can be used in molding powder formulations either alone, or in relation with fillers, such as wood flour, Diatomaceous earth, carbon black and so forth to make molded parts of varied shapes.

They are useful for preparing gaskets, tubing and other materials which are resistant to chemicals and oil. Films of the polycarbonate silica composition prepared in convention manner are useful in wrapping or packaging materials as metal or fiber liners, containers, covers, closures, electrical insulating tapes, sound recording tapes, pipe coverings, etc.

Films and fibers of the material can be beneficially oriented or drawn at elevated temperatures such as from about 50° C. up to about 200° C. In many cases the tensile strength of the composition can be more than doubled by cold drawing. The fiber form of the material can be used for yarn, thread, bristles and rope, etc. and is readily dyed.

Due to their properties, the polycarbonate silica compositions can be used as surface coverings for appliances and the like or as coatings for rods and wire, as insulation and as bonding material for parts or laminates and in adhesive formulations. They are also efficacious in wire enamels, varnishes and paints and can be readily mixed with pigments, stabilizers, plasticizers, etc. The compositions of this invention can also be alloyed with other resinous materials.

Although the invention has been described in considerable detail in the foregoing, it it to be understood that such detail is solely for the purpose of illustration and that many variations can be made by those skilled in the art without departing from the spirit and scope of the invention except as set forth in the claims.

What is claimed is:

1. A polycarbonate composition comprising a polycarbonate and a hydrophobic coated silica.
2. The composition of claim 1 wherein the silica is surface esterified.
3. The composition of claim 1 wherein the silica has a particle size of at least 5 millimicrons.
4. The composition of claim 1 wherein the silica is present in an amount of at least 0.01 percent by weight.
5. The composition of claim 1 wherein the silica is present in an amount of from about 0.01 percent by weight to about 10 percent by weight.
6. A polycarbonate composition comprising a polycarbonate and a surface esterified silica, said esterifying agent being a monohydric alcohol having from 2 to 18 carbon atoms.
7. The composition of claim 6 wherein the silica is present in an amount of from 0.01 percent by weight to about 10 percent by weight.
8. The composition of claim 6 wherein the silica is surface esterified with octadecyl alcohol.
9. The composition of claim 6, wherein the silica is surface esterified with decyl alcohol.
10. A polycarbonate composition which comprises a polycarbonate and hydrophobically coated silica wherein the hydrophobic coating is an organic substance which chemically reacts with the silica surface and is present in stabilizing amounts.

References Cited

UNITED STATES PATENTS

| | | | |
|---|---|---|---|
| 3,271,358 | 9/1966 | Coran et al. | 260—45.7 X |
| 3,208,823 | 9/1965 | Baker et al. | 260—37 X |

FOREIGN PATENTS 1,281,868  12/1961  France.

OTHER REFERENCES

Kohn: Rech. Aerospat. 96, pp. 39–42 and 47–49 (1963).

JAMES A. SEIDLECK, *Primary Examiner.*

L. J. BERCOVITZ, *Examiner.*

M. J. WELSH, *Assistant Examiner.*